US005184018A

United States Patent [19]
Conrads et al.

[11] Patent Number: 5,184,018
[45] Date of Patent: Feb. 2, 1993

[54] SENSOR MATRIX

[75] Inventors: Norbert Conrads, Hauset, Belgium; Ulrich Schiebel; Herfried Wieczorek, both of Aachen, Fed. Rep. of Germany

[73] Assignee: U.S. Philips Corporation, New York, N.Y.

[21] Appl. No.: 644,713

[22] Filed: Jan. 23, 1991

[30] Foreign Application Priority Data

Jan. 27, 1990 [DE] Fed. Rep. of Germany ....... 4002431

[51] Int. Cl.⁵ .......................... H04N 5/32; G01T 1/24
[52] U.S. Cl. ............................ 250/370.09; 250/208.1; 250/214.1; 358/213.27; 358/111; 257/443
[58] Field of Search ...................... 358/213.11, 213.12, 358/213.27, 111; 250/370.08, 370.09, 208.1, 211 J; 357/32

[56] References Cited

U.S. PATENT DOCUMENTS

| | | | |
|---|---|---|---|
| 3,660,667 | 5/1972 | Weimer | 250/209 |
| 4,015,282 | 3/1977 | Shaw | 357/34 |
| 4,382,187 | 5/1983 | Fraleux et al. | 250/578 |
| 4,383,327 | 5/1983 | Kruger | 378/19 |
| 4,689,487 | 8/1987 | Nishiki et al. | 250/361 |
| 4,945,243 | 7/1990 | Arques | 250/370.09 |

FOREIGN PATENT DOCUMENTS 0028960 10/1980 European Pat. Off. .
0332486 9/1989 France .

OTHER PUBLICATIONS

M. A. Bender et al., "The Autofluoroscope", Nucleonics, vol. 21, No. 10-Oct. 1963, pp. 52-56.

Primary Examiner—Carolyn E. Fields
Assistant Examiner—Drew A. Dunn
Attorney, Agent, or Firm—William Squire

[57] ABSTRACT

A matrix of light-sensitive or x-ray sensitive sensors ($S_{1,1}, \ldots S_{2000,200}$) are arranged in rows and columns and generate charges in dependence on the amount of incident radiation. The sensors comprise a respective electric switch (3) and are constructed, like the electric switches (3), of thin-film technology. Each sensor row has a switching line (5, 6, ..., 7) via which the switches can be activated so that the charges of the relevant activated sensor row are simultaneously output via read lines (8, 9, ..., 10, ...). Transfer means convert the signals read in parallel into a serial output signal; in order to achieve an as favorable as possible noise behavior. An amplifier (11, 12, ..., 13) is in each read line and is constructed as a silicon crystal and precedes the transfer means. During the read operations, the amplifiers simplify the signals read from the sensors ($S_{1,1}, \ldots S_{2000,2000}$) connected to the relevant read line (8, 9, ..., 10, ...).

15 Claims, 2 Drawing Sheets

SENSOR MATRIX

FIELD OF THE INVENTION

The invention relates to a device comprising light-sensitive or X-ray sensitive sensors which are arranged in rows and columns in a matrix and which generate charges in dependence on the incident amount of radiation, each of said sensors comprising an electric switch and being constructed, like the electric switches, using a thin-film technique, for each sensor row there being provided a switching line via which the switches can be activated so that the charges of the relevant activated sensor row are simultaneously output via read lines, and also comprising transfer means for converting the signals read in parallel into a serial signal.

BACKGROUND OF THE INVENTION

Of interest is commonly owned copending application Ser. No. 644,712 entitled "Sensor Matrix" by the present inventor and filed concurrently herewith.

A device of this kind is known from European Patent Specification 0 028 960 which corresponds to U.S. Pat. No. 4,382,187. In the known device the charges of the sensors of a row are simultaneously read. To this end, there is provided a circuit for the sensors which activates the electric switches of the sensors so that their charges can be output via a read line provided for each column. The charges of a row are thus simultaneously read, i.e. in parallel. The charges thus read in parallel are applied to transfer means which convert the parallel signals into a serial signal. To this end, according to the cited European Patent Specification a common multiplexer or a common shift register is therefore provided for all read lines.

Notably for X-ray applications only very small X-ray doses are incident on the sensors. Consequently, the electric charge generated in the sensor elements in dependence on the amount of incident of radiation, is also very small. Due to these very small charges to be read, problems are often encountered, i.e. a comparatively strong noise is superposed on the signal read. In order to counteract this problem, the cited European Patent Specification proposes a respective amplifier for each sensor. This amplifier amplifies the charges generated in the sensor, the charges subsequently being readable in amplified form, via an electric switch and the associated read line.

SUMMARY OF THE INVENTION

It is an object of the invention to provide an improved device of the kind set forth.

This object is achieved in accordance with the invention in that in each read line there is provided an amplifier which is composed of crystalline semiconductors and which precedes the transfer means, which amplifier amplifies, during the read operations, the signals read from the sensors connected to the relevant read line.

In sensor matrices of the kind set forth several problems are encountered which should be mitigated as concurrently as possible.

Notably for X-ray applications, where radiation doses are to be minimized, problems are encountered as regards sensor sensitivity. These problems arise because the individual sensor must have an as large as possible sensitive surface area for an as large as possible radiation sensitivity. Moreover, for each sensor there should be provided not only a photosensor element, but also a capacitance which stores the charge as well as an electric switch which is activated when the charge is read. When an individual amplifier is provided for each sensor as in the state of the art, the individual sensor element becomes complex and the radiation-sensitive surface area of the sensor is further reduced. The other possibility, i.e. arranging the amplifier and the actual sensor one over the other in a thin-film substrate, is also problematic because in that case, like in the case of juxtaposed arrangement on the substrate, a higher rejection percentage is to be expected rejects of the substrates during manufacture, because the complexity of the substrate is seriously increased by the presence of the amplifiers. For example, when a sensor matrix comprising 2000 ×2000 elements is to be formed, an acceptable rejection percentage during such manufacture would be impossible to achieve by means of state of the art manufacturing techniques if an additional amplifier were provided for each sensor element.

In accordance with European Patent Specification 0 028 960 the amplifiers are formed, together with the sensors, on a thin-film substrate. The amplifiers are thus also constructed according to the thin-film technique. However, because the amplifiers should be as noise-free and as sensitive as possible for the reasons described above, these requirements cannot be satisfactorily met by the described device, because thin-film amplifiers are problematic in this respect.

The present invention is based on the recognition of the fact that in practice the described noise and manufacturing problems cannot be overcome by means of a device as disclosed in European Patent Specification 0 028 960. Therefore, it is proposed to provide only one amplifier in each read line of the matrix, which amplifier serves to amplify the signals read from all sensors of the relevant column. Thus, instead of providing an amplifier for each sensor, a common amplifier is provided for each sensor column. This amplifier need no longer be manufactured according to the thin-film technique, but is preferably manufactured using the conventional semiconductor crystal technique where, for example silicon can be used as the semiconductor material. As regards noise behavior and sensitivity such amplifiers exhibit substantially better properties than thin-film amplifiers. When such amplifiers in conventional silicon technique are used, the device offers a further essential advantage in that the sensor matrix or the individual sensors have a simple structure which, from a manufacturing-technical point of view, is substantially easier to realize, than the structure in accordance with the state of the art.

These advantages are obtained by combination of the actual sensor matrix, manufactured according to the thin-film technique, and the amplifier which is manufactured according to the conventional silicon technique and only one of which is provided for each read line.

In one embodiment of the invention, the sensors of each column are connected in groups of approximately equal numbers to the various read lines of the column, an amplifier being provided in each read line.

As has already been described, for optimum evaluation, the signal read should be situated as well as possible above the noise level of the overall device. The noise on the read lines, however, is due notably to the lines themselves and to the electric switches of the individual sensors connected to the lines, which switches have capacitances, like the read lines, which have a negative effect on noise. In order to reduce the noise, several read lines may be provided for each column. For example, when three read lines are provided, each time one third of the sensor elements is connected to an individual read line. Thus, the capacitance per read line is also approximately one third of that involved in the solution with only one read line per column. However, when several read lines are provided for each column, an amplifier must be provided in each read line.

In a very attractive embodiment in accordance with the invention, two read lines are provided for each column, half the sensors of each column being connected to one read line, the other half of the sensors of the column being connected to the other read line. In this configuration, one read line for each column can be routed to one side of the substrate, the other read line being routed to the other side of the substrate. In this case it is not necessary to arrange two read lines one adjacent to the other on the substrate, and the length of the read lines is optimized.

In a further embodiment of the invention, the transfer means are provided with several analog multiplexers which are connected to a respective part of the read lines and which convert the read signals simultaneously occurring on the read lines into serial signals.

For the conversion of the signals read in parallel into one or more serial signals there are provided analog multiplexers which are connected to a respective part of the read lines. The read signals occurring on these read lines are then converted into a serial signal by the analog multiplexer.

In a further embodiment in accordance with the invention, each analog multiplexer is succeeded by an A/D converter, each A/D converter being succeeded by a microprocessor or signal processor, in each case two microprocessors which process the signals from neighboring sensors are connected to a common memory.

The various analog multiplexers are succeeded by a respective A/D converter in which the serial output signal of the analog multiplexer is converted into a digital signal. The digital output signals of the A/D converters are further processed by microprocessors. In each case, two microprocessors, processing signals from neighboring sensors, access a common memory.

At the level of the analog multiplexers the signals read in parallel are thus converted into several serial signals. These serial signals are further processed in parallel again. When a sensor matrix comprises, for example 2,000 × 2,000 separate sensors, an analog multiplexer is capable of processing 256 columns of the matrix. Each analog multiplexer then converts 256 parallel signals into one serial signal. In that case 8 analog multiplexers are required, so that at the level of the A/D converters and the microprocessors 8 serial signals are processed in parallel. Such an approach where the parallel signals are converted into serial signals quasi within individual signal groups and the serial signals thus produced are further processed in parallel again, is particularly attractive because the large data volume involved can only be handled in this manner. In the case of a signal read rate of, for example 25 Hz for a complete image, i.e. for all sensors of the matrix, only an extremely short period of time is available for the processing of the signals during which serial processing of the signals by a single microprocessor is not possible. Therefore, the signals are combined in sub-groups in accordance with the invention, after which they are further processed in parallel.

Subsequent to this parallel processing, in a final stage conversion into a common overall video signal containing the signals from all sensors of the matrix takes place. To this end, in a further embodiment of the invention the sensor signals processed by the microprocessors are combined so as to form an overall video signal in a digital multiplexer succeeding the microprocessors.

In a further embodiment of the invention, correction of the signals which are supplied by the individual sensors and which are subsequently amplified is performed through the microprocessors and their accessing of memories which are common to neighboring sensors, so that compensation is made for differences in sensitivity of the sensors, failure of individual sensors, or differences between gain factors of the amplifiers.

Because two microprocessors which process signals from neighboring sensors in the matrix can access a common memory, it is possible for each microprocessor to compare the signals supplied by its associated sensors with those of neighboring sensors. A deviating sensitivity of an individual sensor as well as that of a complete sensor group, being due to a different gain factor of the associated amplifier, can thus be determined and corrected by means of the microprocessors. In the case of a breakdown of a sensor or a failure of a sensor to supply a useful signal, the microprocessor can replace its signal by a calculated signal which may result from, for example the mean value of the signals of the neighboring sensors.

In a further embodiment of the invention, in response to a corresponding control signal the microprocessors combine each time the signals of several sensors which adjoin one another in the column direction and/or the row direction in order to form one signal.

Should the radiation incident on the sensors have a particularly low intensity, noise problems could still occur, despite the improved noise behavior of the device in accordance with the invention, because the signals of the individual sensor elements are too close to the noise level. In that case the signals of neighboring sensors can be combined, i.e. added by the microprocessors. A stronger signal having an improved signal-to-noise ratio is then obtained. For given applications such an improved noise behavior may be more important than the reduction of the matrix resolution due to the combination of signals of neighboring sensors.

Notably in an X-ray examination apparatus the device in accordance with the invention can be advantageously used because a particularly low X-ray dose is desirable for X-ray examinations, optimum benefit then being derived from the favorable noise behavior of the device in accordance with the invention.

IN THE DRAWING

An embodiment in accordance with the invention will be described in detail hereinafter with reference to the drawing. Therein:

FIG. 1 shows a device with a part of a sensor matrix comprising silicon amplifiers and an analog multiplexer, and FIG. 2 shows further transfer means of the device shown in FIG. 1.

DESCRIPTION OF THE PREFERRED EMBODIMENT

Figure 1:
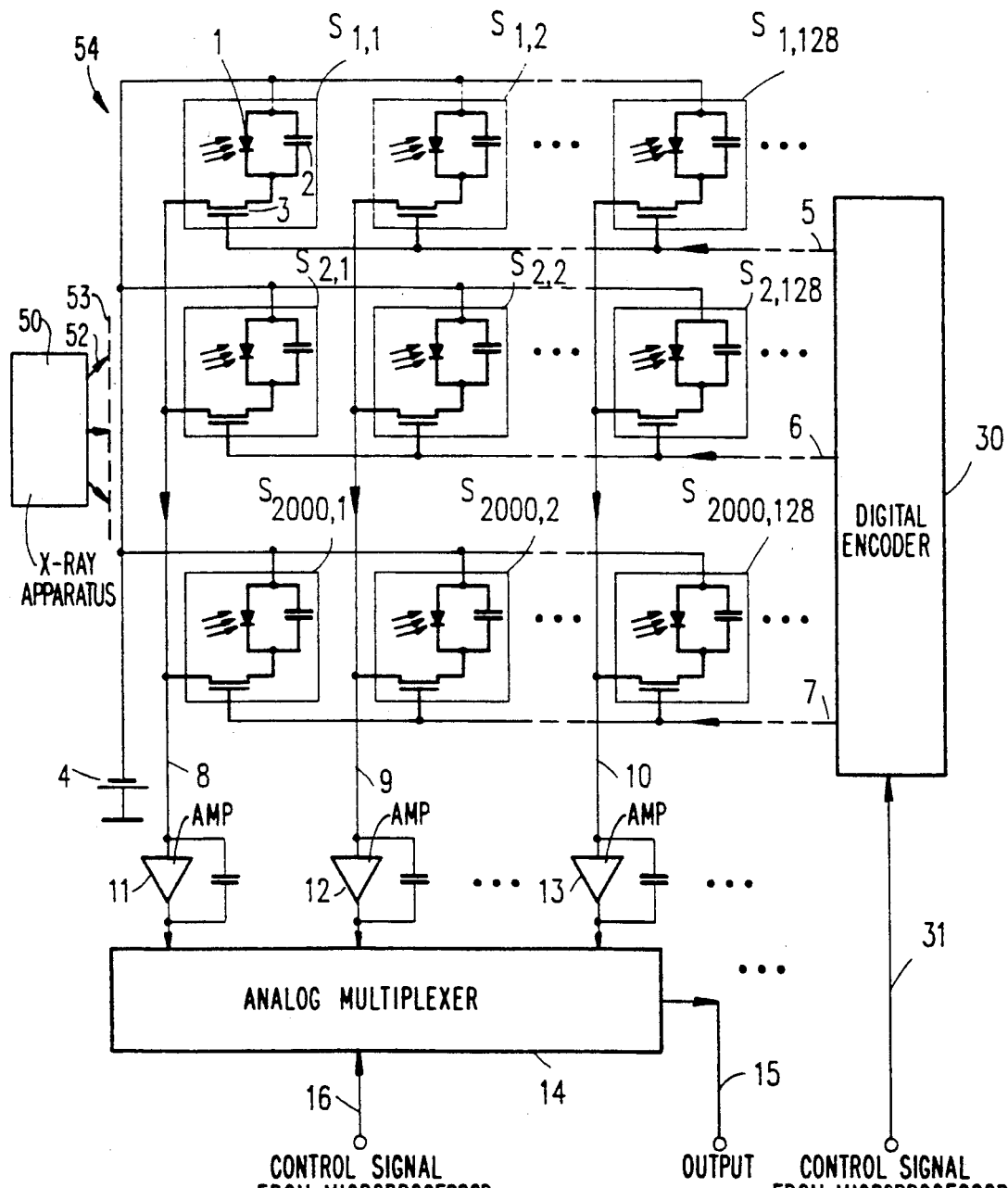

FIG. 1 shows a part of a device 54 which is used in connection with x-ray apparatus 50 which generates x-ray radiation 52, the radiation passing through an object 53 being examined. The device 54 comprises a matrix which is only partly shown. The matrix consists of sensors which are arranged in rows and columns in the matrix. Such a matrix may comprise, for example 2,000×2,000 sensors, only a few of which are indicated in the Figure.

In the first row of the matrix shown in the Figure there are indicated sensors $S_{1,1}$ and $S_{1,2}$. In the same row, the sensor $S_{1,2}$ is succeeded by sensors which are not shown. However, the Figure shows the sensor $S_{1,128}$ which is the 128th sensor of the first row. In this row there are provided further sensor elements, up to approximately 2,000, which are not shown in the Figure.

The same is applicable to the second row of the matrix; the Figure shows the sensors $S_{2,1}$, $S_{2,2}$ and $S_{2,128}$ of this second row. However, this second row again comprises a total of approximately 2,000 sensor elements.

These first two rows of sensors are followed by further rows which are not shown in the Figure. The Figure merely shows the last row, i.e. row 2,000. The first sensor in this row is referred to as $S_{2000,1}$, the second sensor bearing the reference $S_{2000,2}$. Like in the rows 1 and 2, the Figure does not show further sensors, except for the sensor $S_{2000,128}$. The first sensors of each row together constitute the first column, the second sensors of each row constituting the second column etc.

Each of the sensors, a few of which are shown in FIG. 1, comprises a photosensor element. When suitable semiconductors are used, this photosensor element itself may already be sensitive to X-rays. However, it may also be a light-sensitive photodiode which receives light when X-rays are incident on a phosphor layer provided on the photodiode. In the Figure the photosensor elements are indicated as photodiodes I. Furthermore, each sensor has a storage capacitance 2. The anode of the photodiode 1 and an electrode of the storage capacitance 2 are both connected to a direct voltage source 4 providing negative direct bias. The cathode of the photodiode I and the other electrode of the storage capacitance 2 are both connected to a source terminal of a switching field effect transistor 3.

All sensors of the matrix comprise a respective photodiode 1, a storage capacitance 2 and a field effect transistor 3 and are manufactured entirely by means of the thin-film technique.

When radiation is incident on the photodiode 1, the photodiode becomes conductive and, due to the bias introduced by the direct voltage source 4, charge is transferred to the storage capacitance 2, the amount of charge being dependent on the intensity of the radiation incident on the photodiode 1. The charge stored in the capacitance 2 after a given period of time, therefore, is a measure of the radiation intensity. This charge can be individually read for each sensor element via the switching transistors 3.

To this end, for each row of the sensor matrix there is provided a switching line. In the representation of FIG. 1, a switching line 5 is provided for the first line, a switching line 6 being provided for the second row and a switching line 7 for the row 2000. These switching lines are connected to the gate terminals of the field effect transistors 3 in the sensors. A switching line thus activates the transistors 3 of the associated row. For example, the switching line 5 activates all transistors 3 of the first row of the matrix.

The switching lines 5, 6, 7 and the further switching lines which are not shown in the Figure can be controlled by means of a digital decoder 30. The digital decoder 30 serves to activate the rows of the sensor matrix successively during a read operation for the charges stored in the sensors. This is realized so that, for example first the switching line 5 for the first row is activated so that the transistors thereof become conductive, subsequently the switching line 6 being activated in order to activate the transistors 3 of the second row, and so on until the row 2000 is reached. The digital decoder 30 itself is controlled via a control line 31. This can be realized, for example by means of a microprocessor which is not shown in the Figure and which provides overall control for the read operation.

For each column of the matrix which is partly shown in FIG. 1 there is provided a respective read line. For example, the first column, of which only the sensors $S_{1,1}$, $S_{2,1}$, and $S_{2000,1}$, are indicated in the Figure, comprises a read line 8. Similarly, the second column comprises a read line 9, and the column 128 indicated in the Figure comprises a read line 10. The columns which are not shown in the Figure also comprise a respective read line. The read lines are connected together to the drain terminals of the field effect transistors 3 of the associated column. For example, the read line 8 of the first column is connected to the drain terminals of the field effect transistors 3 of all sensors arranged in this column.

In each read line, only the read lines 8, 9 and 10 being indicated in the Figure, there is provided an amplifier. In FIG. 1, an amplifier 11 is provided in the read line 8, an amplifier 12 being provided in the read line 9 while a amplifier 13 is provided in the read line 10. The amplifiers are each arranged in the read line so that they amplify the charges emanating from the individual sensors. The amplifiers precede an analog multiplexer 14 whose inputs are connected to the outputs of the amplifiers. The amplifiers are connected as current integrators and, with their associated analog multiplexer, are manufactured as an integrated circuit using the conventional silicon crystal technique.

For example, when the first row is read, the field effect transistors 3 of the sensors present in this row are activated via the switching line 5. The charges stored in the capacitances 2 of the sensors present in this row are then output via the field effect transistor 3 of the relevant sensor and via the read line. Thus, in this case all sensors of this row are simultaneously activated and the charges stored in the sensors are output simultaneously via the read lines. For the sensors indicated in the Figure this means that charges reach the analog multiplexer 14 via the read lines 8, 9 and 10 and the subsequent amplifiers 11, 12 and 13. In the analog multiplexer 14 the charges, arriving simultaneously and in parallel, are converted into a serial signal which is available on a serial output 15 of the multiplexer. The multiplexer 14 is controllable via a control line 16 which can be controlled, for example like the digital decoder 30, by means of an external microprocessor which is not shown in the Figure.

Because the Figure shows only a comparatively small part of the matrix comprising a total of 2000×2000 sensors, the further circuitry of the analog multiplexer 14 is not completely shown either. A total of 128 read lines are connected to the analog multiplexer 14, the signals of the read lines being converted by the multiplexer so as to form one serial output signal which is present on the output 15. Because the matrix comprises a total of 2000 columns, 16 of such analog multiplexers are required, but the Figure shows only one multiplexer.

During a read operation for the sensor matrix, the rows are successively activated, upon activation of a row the charges of all sensors present in the relevant row being output. Subsequently, the next row is activated, so that again the charges stored in the sensors of this row are output. This operation is repeated until row 2000 is reached. During each read operation the sensor signals arriving in parallel are converted into a serial signal by the analog multiplexer. Because of the multitude of sensors, this is done in groups of 128 sensors. Because 16 analog multiplexers are provided in total, 16 serial signals are thus obtained, each of the signals representing the signals of 128 sensors of a row.

Figure 2:
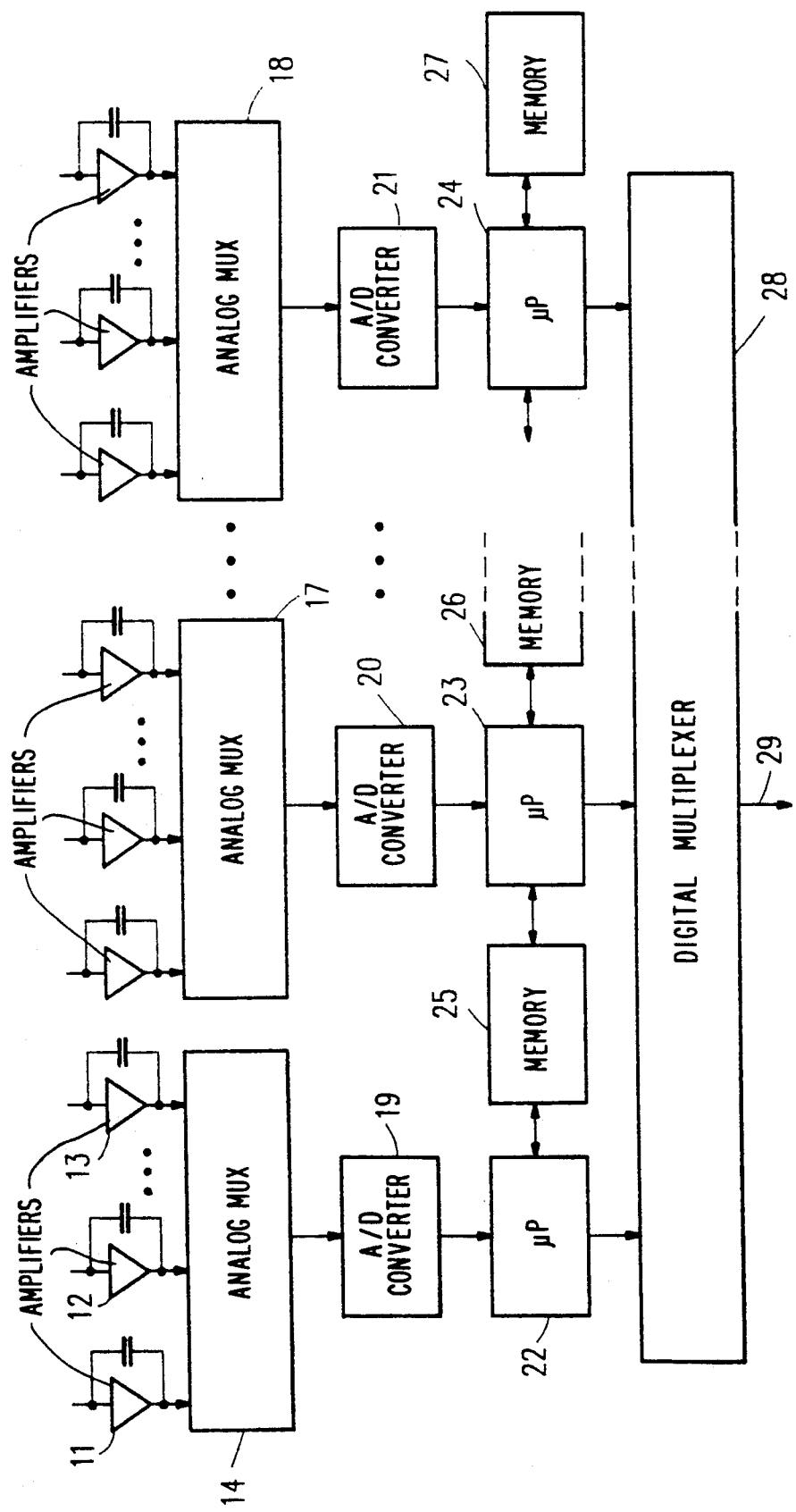

FIG. 2 shows further transfer means associated with the device shown in FIG. 1. FIG. 2 shows the amplifiers 11, 12 and 13 and the analog multiplexer 14 according to FIG. 1. However, because 2000 sensor elements are provided per row as stated above, a total of 16 analog multiplexers are included in the transfer means. Of these multiplexers FIG. 2 shows only the multiplexer 14, a further multiplexer 17 and final a multiplexer 18. Each of these analog multiplexers 17 and 18 as well as the further analog multiplexers which are not shown in the Figure comprises, like the multiplexer 14, 128 inputs which are preceded by amplifiers whose inputs are connected, via the read lines, to the relevant column.

Each of the analog multiplexers is succeeded by a respective analog-to-digital converter. FIG. 2 shows an analog-to-digital converter 19 which succeeds the multiplexer 14, as well as an analog-to-digital converter 20 which succeeds the analog multiplexer 17. The same structure is provided the further analog multiplexers which are not shown in the Figure. The Figure shows the multiplexer 18 as the last multiplexer which is succeeded by an A/D converter 21.

The A/D converter 19 is succeeded by a microprocessor 22, the A/D converter 20 by a microprocessor 23, and the A/D converter 21 by a microprocessor 24. The other A/D converters which are not shown in the Figure are also succeeded by a respective microprocessor. The microprocessors 22 and 23 access a common memory 25. The microprocessor 23 also accesses a memory 26 which is also accessed, in a manner not shown in the Figure, by a further microprocessor. The microprocessor 24 also accesses two memories, of which only the memory 27 is shown in the Figure.

The microprocessors serve to process the digital signals which are supplied by the A/D converters and which originate from the signals read in the sensors. For example, different sensitivities of the sensors, different sensitivities of the amplifiers or other errors can thus be compensated for. This is possible because each of the microprocessors can access a memory in which not only the signals of its associated sensors are stored, but also the signals of the neighboring sensors which are processed per se by another microprocessor. For example, the microprocessor 22 can access the memory 25 in which, however, also the signals are stored which are processed by the microprocessor 23 and which stem from sensors which neighbor the sensors in the matrix whose signals are processed by the microprocessor 22. Differences in sensitivity of the sensors or the amplifiers can be detected by comparison of the signals of neighboring sensors. Furthermore, the microprocessors are capable of detecting the breakdown of individual sensor elements. The signals thereof can then be replaced, for example by averaged signals from the neighboring sensors. Subsequent to this operation, each of the microprocessors supplies an output signal of the sensors of the associated columns. These digital output signals are applied to a digital multiplexer 28 in which the 16 signals from the 16 microprocessors are combined so as to form an overall signal having a serial character. This signal becomes available on an output 29 of the digital multiplexer 28 and represents the overall signal of the device which contains the signals of all sensors of the matrix.

What is claimed is:

1. A radiation sensor device comprising:
   an array of radiation sensors arranged in rows and columns in a matrix, said sensors each generating a charge the magnitude of which is in dependence upon the amount of incident radiation on that sensor;
   a plurality of electric switches, each associated with a different sensor, said sensors and switches each comprising thin film elements;
   a plurality of switch control lines, each line corresponding to a different row for receiving an applied switch activate signal for activating the switches of that row to simultaneously output the charges of the sensors corresponding to the relevant activated switches of a sensor row;
   a plurality of parallel read lines for receiving the outputted charges;
   transfer means for converting the outputted charges on said read lines into a serial signal; and
   an amplifier comprising a crystalline semiconductor coupled to each read line preceding said transfer means for amplifying the outputted charges on the corresponding read line.

2. A device as claimed in claim 1 wherein said read lines are arranged in columns, each read line corresponding to a column of sensors, the sensors of each column being connected in groups of approximately equal numbers to the corresponding read lines of the different columns, an amplifier being provided in each read line.

3. A device as claimed in claim 1 wherein the transfer means comprises a plurality of analog multiplexers, each of which is coupled to a respective different portion of the read lines for converting the read signals simultaneously occurring in the corresponding read lines into serial signals.

4. A device as claimed in claim 3, wherein each analog multiplexer is succeeded by a respective A/D converter being succeeded by a respective signal processing means, the signal processing means which process the signals from neighboring sensors being coupled to a common memory.

5. A device as claimed in claim 4, wherein the sensor signals processed by the signal processing means are combined so as to form an overall signal in a digital multiplexer succeeding the signal processing means.

6. A device as claimed in claim 4 wherein the signal processing means each comprise a microprocessor, the signals supplied by the individual amplifiers being corrected by the microprocessors, the microprocessors accessing the common memories for compensating for differences in sensitivity of the sensors, breakdown of individual sensors, and differences in gain factors of the amplifiers.

7. A device as claimed in claim 3 wherein the amplifiers in the read lines and the subsequent analog multiplexers are combined in integrated circuits so that each analog multiplexer and its associated amplifiers are arranged in an integrated circuit.

8. A device as claimed in claim 4 wherein in response to an appropriate control signal, the signals of several sensors which neighbor one another in the column direction and/or row direction are combined so as to form one signal by the signal processing means.

9. A device as claimed in claim 1 wherein the amplifiers are connected as current integrators.

10. A device as claimed in claim 5 wherein the signal processing means each comprise a microprocessor, the signals supplied by the individual amplifiers being corrected by the microprocessors, the microprocessors accessing the common memories for compensating for differences in sensitivity of the sensors, breakdown of individual sensors, and differences in gain factors of the amplifiers.

11. A device as claimed in claim 6 wherein the amplifiers in the read lines and the subsequent analog multiplexers are combined in integrated circuits so that each analog multiplexer and its associated amplifiers are arranged in an integrated circuit.

12. A device as claimed in claim 11 wherein in response to an appropriate control signal, the signals of several sensors which neighbor one another in the column direction and/or row direction are combined so as to form one signal by the signal processing means.

13. A device as claimed n claim 12 wherein the amplifiers are connected as current integrators.

14. In an X-ray examination apparatus, a radiation sensor device comprising:
- an array of X-ray radiation sensors arranged in rows and columns in a matrix, said sensors each generating a charge the magnitude of which is in dependence upon the amount of incident X-ray radiation on that sensor;
- a plurality of electric switches, each associated with a different sensor, said sensors and switches each comprising thin film elements;
- a plurality of switch control lines, each line corresponding to a different row for receiving an applied switch activate signal for activating the switches of that row to simultaneously output the charges of the sensors corresponding to the relevant activated switches of a sensor row;
- a plurality of parallel read lines for receiving said outputted charges;
- transfer means for converting the outputted charges on said read lines into a serial signal; and
- an amplifier comprising a crystalline semiconductor coupled to each read line preceding said transfer means for amplifying the outputted charges on the corresponding read line.

15. An X-ray examination apparatus comprising:
X-ray generating means for examining an object with said X-rays; and
sensor device for sensing the X-rays representing said object;
said sensor device comprising:
- an array of radiation sensors arranged in rows and columns in a matrix, said sensors each generating a charge the magnitude of which is in dependence upon the amount of incident radiation on that sensor;
- a plurality of electric switches, each associated with a different sensor, said sensors and switches each comprising thin film elements;
- a plurality of switch control lines, each line corresponding to a different row for receiving an applied switch activate signal for activating the switches of that row to simultaneously output the charges of the sensors corresponding to the relevant activated switches of a sensor row;
- a plurality of parallel read lines for receiving said outputted charges;
- transfer means for converting the outputted charges on said read lines into a serial signal; and
- an amplifier comprising a crystalline semiconductor coupled to each read line preceding said transfer means for amplifying the outputted charges on the corresponding read line.

* * * * *